(12) United States Patent
Gryting et al.

(10) Patent No.: US 11,599,480 B2
(45) Date of Patent: Mar. 7, 2023

(54) REPLACING COMPROMISED DATA IN A SELF-HEALING SYSTEM

(71) Applicant: Raytheon Company, Waltham, MA (US)

(72) Inventors: Paul Gryting, Helotes, TX (US); Cody L. Tankersley, Owens Cross Roads, AL (US); Nathan T. Palmer, Austin, TX (US)

(73) Assignee: Raytheon Company, Waltham, MA (US)

( * ) Notice: Subject to any disclaimer, the term of this patent is extended or adjusted under 35 U.S.C. 154(b) by 99 days.

(21) Appl. No.: 17/198,538

(22) Filed: Mar. 11, 2021

(65) Prior Publication Data

US 2021/0311885 A1   Oct. 7, 2021

Related U.S. Application Data

(60) Provisional application No. 63/004,112, filed on Apr. 2, 2020.

(51) Int. Cl.
*G06F 12/00* (2006.01)
*G06F 12/14* (2006.01)

(52) U.S. Cl.
CPC ...... *G06F 12/1433* (2013.01); *G06F 12/1408* (2013.01); *G06F 12/1441* (2013.01)

(58) Field of Classification Search
CPC .......... G06F 21/50; G06F 21/57; G06F 21/60; H04L 63/14; H04L 63/1408
See application file for complete search history.

(56) References Cited

U.S. PATENT DOCUMENTS

| | | | |
|---|---|---|---|
| 8,495,037 B1* | 7/2013 | Westenberg | G06F 21/56 707/698 |
| 2015/0101054 A1* | 4/2015 | Zhou | H04L 63/1408 726/24 |
| 2017/0185429 A1 | 6/2017 | Jeansonne et al. | |
| 2017/0315890 A1 | 11/2017 | Jibbe et al. | |

OTHER PUBLICATIONS

Search Report and Written Opinion dated May 26, 2021 for PCT Application No. PCT/2021/021840; 13 pages.
International Report on Patentability dated Oct. 13, 2022 for PCT Application No. PCT/2021/021840; 8 pages.

* cited by examiner

*Primary Examiner* — Arvind Talukdar
(74) *Attorney, Agent, or Firm* — Daly, Crowley, Mofford & Durkee, LLP

(57) ABSTRACT

A method for use in a computing system, comprising: storing, in a random-access memory, a working copy of a data item, the working copy of the data item being stored in the random-access memory by a first processor; registering, with a second processor, a respective address in the random-access memory where the working copy of the data item is stored; and correcting, by the second processor, any modifications to the working copy of the data item that are made after the working copy of the data item is stored in the random-access memory, the modifications being corrected in parallel with the first processor executing software based on the working copy of the data item.

20 Claims, 5 Drawing Sheets

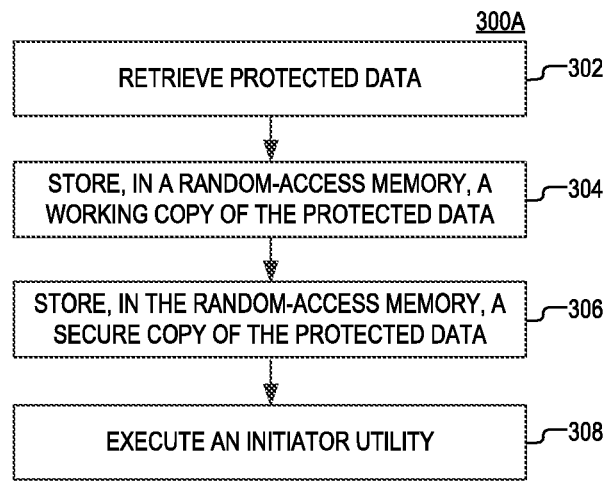
FIG. 3A
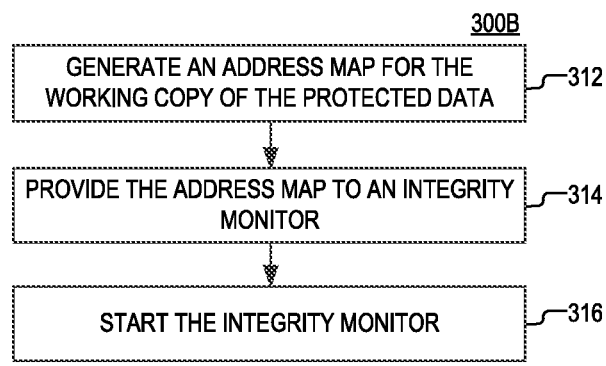
FIG. 3B
FIG. 3C

REPLACING COMPROMISED DATA IN A SELF-HEALING SYSTEM

RELATED APPLICATIONS

This application claims the benefit of U.S. Provisional Application No. 63/004,112, filed Apr. 2, 2020, and entitled "HARDWARE-ASSISTED IN-MEMORY HEALING," which is incorporated herein by reference in its entirety.

BACKGROUND

In a computing system, system memory can be corrupted inadvertently or maliciously. An attacker, for example, can gain access to a computing system by replacing critical firewall settings that are stored in the random-access memory of the system. As another example, an attacker can render an autonomous vehicle inoperable by replacing critical mission settings that are stored in the random-access memory of a computing system that controls the vehicle. Accordingly, preventing the replacement of critical data that is stored in a computing system's memory can help ensure the safe and reliable operation of the computing system.

SUMMARY

According to aspects of the disclosure, a method is provided for use in a computing system, comprising: storing, in a random-access memory, a working copy of a data item, the working copy of the data item being stored in the random-access memory by a first processor; registering, with a second processor, a respective address in the random-access memory where the working copy of the data item is stored; and correcting, by the second processor, any modifications to the working copy of the data item that are made after the working copy of the data item is stored in the random-access memory, the modifications being corrected in parallel with the first processor executing software based on the working copy of the data item.

According to aspects of the disclosure, a system is provided, comprising: a random-access memory; a first processor operatively coupled to the random-access memory; and a second processor that is operatively coupled to the random-access memory; wherein the first processor is configured to store, at a respective address in the random-access memory, a working copy of a data item, and register, with the second processor, the respective address in the random access memory where the working copy of the data item is stored; and wherein the second processor is configured to correct any modifications to the working copy of the data item that are made after the working copy of the data item is stored at the respective address in the random-access memory, the modifications being corrected in parallel with the first processor executing software based on the working copy of the data item.

According to aspects of the disclosure, a non-transitory computer readable storage medium is provided that stores one or more processor executable instructions, which, when executed by a computing system cause the computing system to perform the operations of: storing, in a random-access memory, a working copy of a data item, the working copy of the data item being stored in the random-access memory by a first processor; registering, with a second processor, a respective address in the random-access memory where the working copy of the data item is stored; and correcting, by the second processor, any modifications to the working copy of the data item that are made after the working copy of the data item is stored in the random-access memory, the modifications being corrected in parallel with the first processor executing software based on the working copy of the data item.

BRIEF DESCRIPTION OF THE DRAWINGS

The foregoing features may be more fully understood from the following description of the drawings in which:

FIG. 3A is a flowchart of an example of a process, according to aspects of the disclosure;

FIG. 3B is a flowchart of an example of a process, according to aspects of the disclosure;

FIG. 3C is a diagram of an example of an address map, according to aspects of the disclosure;

DETAILED DESCRIPTION

Figure 1:
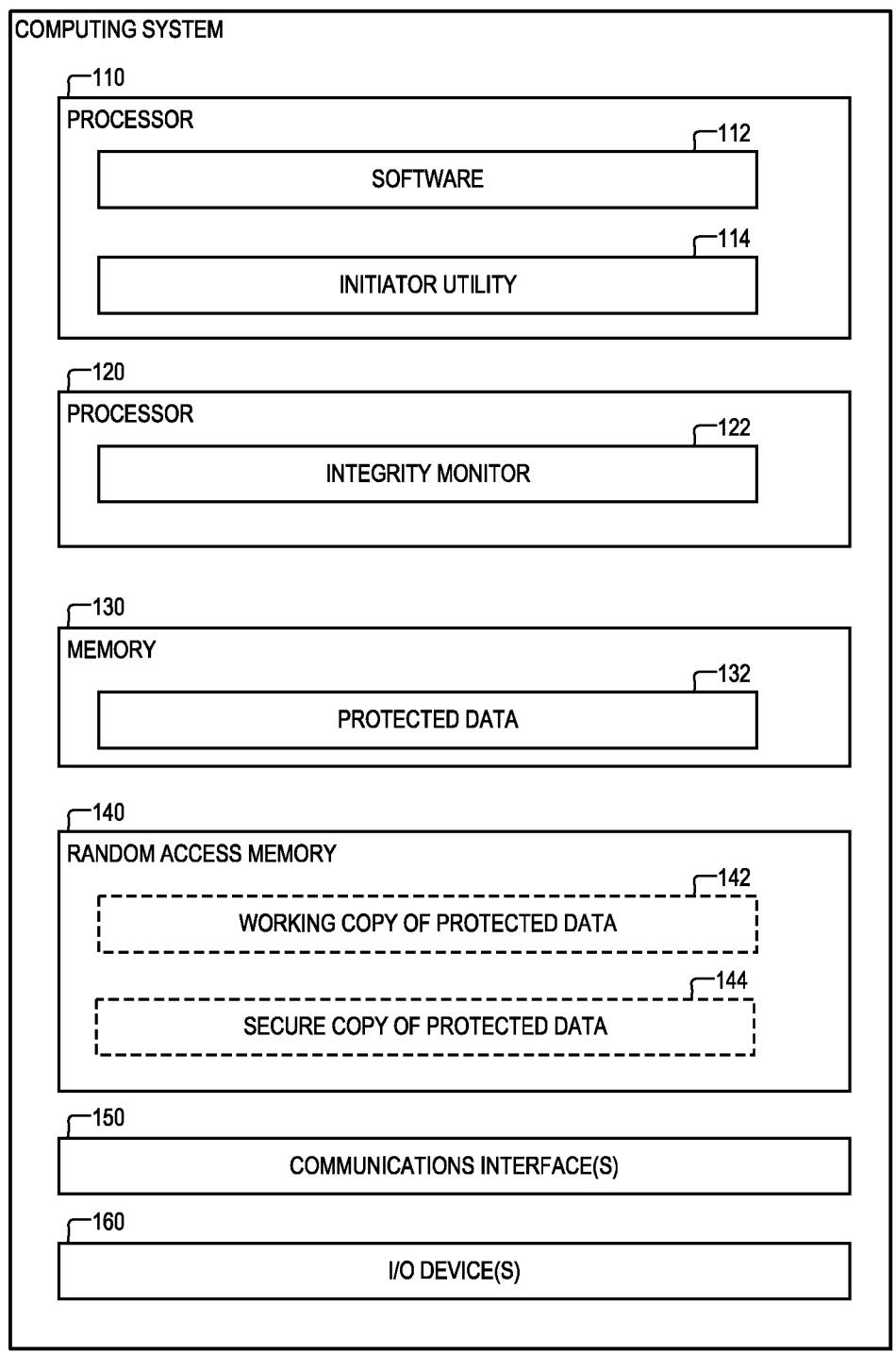
FIG. 1 is a diagram of an example of a computing system, according to aspects of the disclosure.

FIG. 1 is a diagram of an example of a computing system 100, according to aspects of the disclosure. In some implementations, the system 100 may include a general-purpose computer, such as a desktop computer, a laptop computer, a smartphone, or a data server. Additionally or alternatively, in some implementations, the system may include a special-purpose computer, such as a control unit that is arranged to control the operation of industrial equipment, a control unit that is arranged to control the operation of an autonomous vehicle, or a control unit that is used to control the operation of various types of weapon systems. The present disclosure, in other words, is not limited to any specific implementation of the computing system 100.

The computing system 100 may include a first processor 110, a second processor 120, a memory 130, and random-access memory 140, one or more communications interfaces 150, and one or more I/O devices 160. The memory 130 may include any suitable type of volatile or non-volatile memory, such as a solid-state drive (SSD), a hard disk (HD), or a non-volatile Random-Access Memory (nvRAM), for example. Although in the example of FIG. 1 the memory 130 is depicted as being integrated into the computing system 100, alternative implementations, are possible in which the memory 130 is separate from the computing system 100. For example, in such implementations, the memory 130 may include a cloud storage or a remote data server. The random-access memory 140 may include any suitable type of random-access memory, such as a non-volatile random-access memory (nvRAM) device or a synchronous dynamic random-access memory (SDRAM) device, for instance. The communications interface(s) 150 may include one or more of a Bluetooth interface, a WiFi interface, an Ethernet interface, a cellular network communications interface, a satellite communications interface, and/or any other suitable type of communications interface. The I/O device(s) 160 may include one or more of a keyboard, a mouse, a touchscreen, a display device, a printer, a microphone, a speaker, and/or any other suitable type of I/O device.

The processor 110 may be configured to execute software 112 and an initiator utility 114. The software 112 may include an operating system and/or any other suitable type of software that is executed within (or outside of) the operating system. For example, in some implementations, the software 112 may include logic that is arranged to guide a missile or drone to a target and deploy one or more weapons once the target is reached. As another example, the software 112 may include logic that is arranged to guide an autonomous vehicle to a destination. As yet another example, the software 112 may include logic that is arranged to control industrial equipment. Stated succinctly, the present disclosure is not limited to any specific type of software being executed on the processor 110.

The initiator utility 114 may include a system driver (e.g., a driver for the second processor), a system service, and/or any other suitable type of software utility. As is discussed further below, the initiator utility may be configured to start the operation of an integrity monitor 122. The integrity monitor 122 may include logic for maintaining the integrity of data that is stored at specified locations in the random-access memory 140. The integrity monitor 122 may repeatedly (e.g., randomly, periodically or in accordance with a schedule) poll the specified memory locations to detect whether the data has been modified (either maliciously or by accident). Furthermore, in response to detecting that any of the data has been modified, the integrity monitor 122 may return the data to its original state. In other words, the integrity monitor 122 may detect and neutralize intrusions into the computing system 100 that cause sensitive data that is stored in the random-access memory 140 to be replaced or modified. As can be readily appreciated, providing the integrity monitor 122 in the computing system 100 is advantageous because it can increase the reliability of the computing system 100.

The memory 130 may be configured to store protected data 132. In some implementations, the protected data 132 may include firewall settings, access credentials, and/or any other suitable type of configuration settings data of the computing system 100. Additionally or alternatively, in some implementations, the protected data 132 may include mission data that identifies a target and a route for a missile or drone. Additionally or alternatively, in some implementations, the protected data may identify a route and a destination for an autonomous vehicle. Additionally or alternatively, in some implementations, the protected data 132 may identify parameters for one or more operations that are performed by industrial equipment. In other words, the protected data may include any suitable type of data that is needed for the safe operation of the software 112 and/or the computing system 100.

When the computing system 100 is booted (or at another time), the processor 110 may store a working copy 142 of the protected data 132 in the random-access memory 140. Furthermore, when the computing system 100 is booted (or at another time), one of the processor 110 or the processor 120 may store a secure copy 144 of the protected data 132 in the random-access memory 140. The secure copy 144 of the protected data 132 may include any copy of the protected data 132 that is considered to be valid, or uncompromised, by the processor 120. In some implementations, the processor 110 may execute the software 112 based on the working copy 142 of the protected data 132. As noted above, the protected data 132 may include configuration settings, mission data, and/or any other information that is necessary for the execution of software 112. Furthermore, in some implementations, the processor 120 (and/or the integrity monitor 122) may compare the secure copy 144 of the protected data 132 to the working copy 142 of the protected data 132 to detect any modifications to the working copy 142 of the protected data 132. When the working copy 142 of the protected data 132 is found to have been modified, the processor 120 (and/or the integrity monitor 122) may restore the working copy 142 of the protected data 132 to its correct state by replacing portions of the working copy 142, which have been modified, with corresponding portions from the secure copy 144 of the protected data 132. In some implementations, the processor 120 may detect and correct modifications to the working copy 142 of the protected data 132 concurrently with the processor 110 executing the software 112 based on the working copy 142 of the protected data 132. Additionally or alternatively, in some implementations, the processor 120 may detect and correct modifications to the working copy 142 of the protected data 132 in real-time or near real-time, thus greatly increasing the security of the computing system 100.

In some implementations, the processor 120 may be dedicated to monitoring the integrity of the working copy 142 of the protected data 132, and it may be arranged to execute only the integrity monitor 122. Additionally or alternatively, in some implementations, the integrity monitor 122 may be implemented in software, in hardware, or as a combination of software and hardware. For the sake of clarity, the integrity monitor 122 and the processor 120 are depicted in FIG. 1 as separate entities. However, it will be understood that, in some implementations, they may be the same entity (e.g., when the processor 120 is an application-specific circuit implementing the logic of the integrity monitor 122). In some implementations, the working copy 142 and the secure copy 144 of the protected data 132 may be subject to different access restrictions. For example, the software 112 (and/or the processor 110) may be granted access to the working copy 142 of the protected data 132, while being denied the same access to the secure copy 144 of the protected data 132. Furthermore, in some implementations, the processor 110 may be isolated from the processor 120, such that the processor 110 is unable to affect the operation of the processor 120 beyond causing the processor 120 to begin executing the integrity monitor 122. In such implementations, the processor 110 (and/or integrity monitor 122) may be configured such that the processor 110 is unable to stop or otherwise interfere with the operation of the integrity monitor 122 after the integrity monitor has begun executing. Although in the example of FIG. 1, the working copy 142 and the secure copy 144 of the protected data 132 are depicted as being stored in the same memory module, it will be understood that in some implementations, they may be stored on different memory modules. For example, in some implementations, the secure copy 144 may be stored in a read-only memory module. Furthermore, in some implementations, the secure copy 144 can be stored in physically separate random-access memory than that of the working copy 142. For example, the working copy 142 may be stored in a random-access memory device, and the secure copy 144 may be stored in a second memory device. The first memory device 142 and the second memory device may each have a separate address space or they may be part of the same address space.

Figure 2:
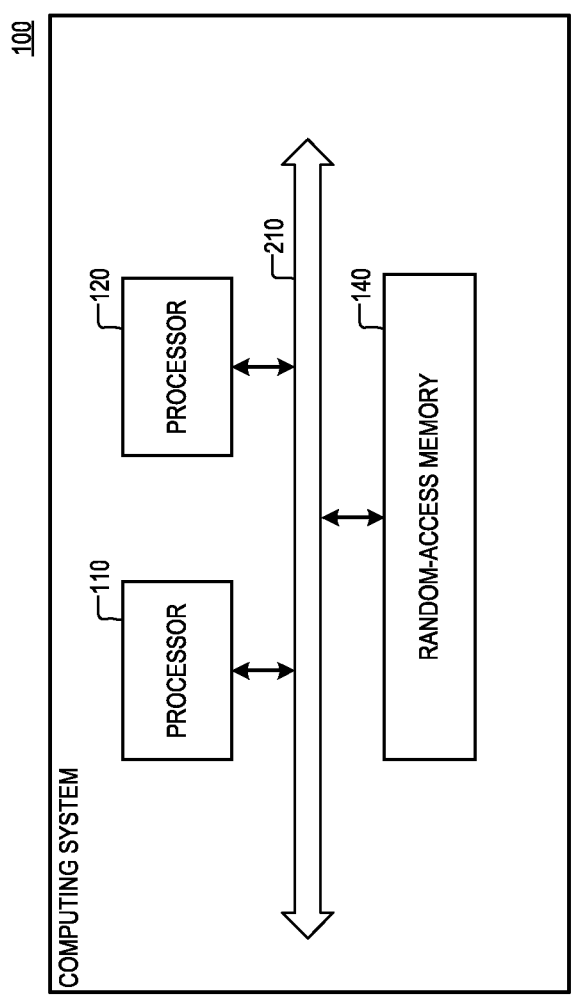
FIG. 2 is a diagram illustrating aspects of the operation of the computing system of FIG. 1, according to aspects of the disclosure.

FIG. 2 shows aspects of the computing system 100, according to aspects of the disclosure. As illustrated, the processors 110 and 120 may be configured to access the random-access memory 140 independently of one another over a bus 210. For example, the processor 110 may read and write data from the random-access memory 140 by directly interacting with the random-access memory 140 or a controller of the random-access memory 140 (i.e., without any data that is being read or written passing through the processor 120). Similarly, the processor 120 may read and write data from the random-access memory 140 by directly interacting with the random-access memory 140 or a controller of the random-access memory 140 (i.e., without any data that is being read or written passing through the processor 110). In some implementations, the processor 110 and the processor 120 may be cores of the same general-purpose processing unit (e.g., a RISC processor, an x86 processor, etc.). Additionally or alternatively, in some implementations, the processor 110 may include one or more cores of a central processing unit (e.g., a RISC processor, an x86 processor, or another general-purpose processor, etc.) and the processor 120 may include an application specific circuit that is configured to perform operations relating to the monitoring and healing of the working copy 142 of the protected data 132. In implementations in which the processor 120 is implemented as an application-specific circuit, the processor 120 may be coupled to a PCIe bus (or another system bus) in the same or similar way as other system devices (e.g., network adapters, video cards, etc.) are connected to system busses. In implementations in which the processor 120 is implemented as an application-specific circuit, the initiator utility 114 may include a system driver for the application-specific circuit. Additionally or alternatively, in some implementations, the processor 110 and the processor 120 may be part of different general-purpose processing units. Additionally or alternatively, the processor 110 may be part of a special-purpose processing unit. Irrespective of how the processor 120 is implemented, in some implementations, the processor 120 may be configured to perform operations relating to the monitoring and healing of the working copy 142 of the protected data 132 concurrently with the processor 110 executing the software 112 based on the working copy 142 of the protected data 132. In some implementations, the operations relating to the monitoring and healing of the working copy 142 of the protected data 132 may include operations performed by any of the processes 400, 500A, and 500B, which are discussed further below with respect to FIGS. 4, 5A, and 5B.

FIG. 3A is a flowchart of an example of a process 300A, which is performed by the processor 110. At step 302, the processor 110 retrieves the protected data 132 from the memory 130. At step 304, the processor 110 stores, in the random-access memory 140, the working copy 142 of the protected data 132. At step 306, the processor 110 stores, in the random-access memory 140, the secure copy 144 of the protected data 132. At step 308, the processor 110 executes the initiator utility 114. Executing the initiator utility 114 causes the processor 110 to: (i) register, with the processor 120, the memory locations, in the random-access memory 140, where the working copy 142 of the protected data 132 is stored, and (ii) start the execution of the integrity monitor 122. In some implementations, when the initiator utility 114 is executed, the initiator utility 114 (and/or processor 120) may perform a process 300B, which is discussed below with respect to FIG. 3B.

FIG. 3B is a flowchart of an example of a process 300B, which is performed by the initiator utility 114 (and/or processor 120). At step 312, the initiator utility 114 generates an address map 300C (shown in FIG. 3C) that identifies the respective addresses in the random-access memory 140 where the working copy of the protected data 132 is stored. At step 314, the initiator utility provides the address map 300C to the processor 120 (and/or the integrity monitor 122). In some implementations, providing the address map 300C to the processor 120 (and/or the integrity monitor 122) may include storing the address map 300C in a memory that is accessible by the processor 120. However, it will be understood that the present disclosure is not limited to any specific method for exchanging data between the processor 110 and the processor 120. At step 316, the initiator utility 114 starts the integrity monitor 122. In some implementations, starting the integrity monitor 122 may include transmitting to the processor 120 an instruction, which, when received by the processor 120, causes the processor 120 to begin executing the process 400 (see FIG. 4). Additionally or alternatively, in some implementations, starting the integrity monitor 122 may include generating an interrupt that causes the processor 120 to begin executing the process 400. Additionally or alternatively, in some implementations, starting the integrity monitor 122 may include changing the state of a predetermined register (or memory location). Stated succinctly, the present disclosure is not limited to any specific method for starting the integrity monitor 122.

FIG. 3C is a diagram of an example of an address map 300C, according to aspects of the disclosure. The address map 300C identifies the addresses in the random-access memory 140, where the working copy 142 of the protected data 132 is stored. As illustrated, the address map 300C may include a plurality of entries 322. Each entry 322 may correspond to a different one of a plurality of protected data items, and identify the address in the random-access memory 140, where a working copy of the protected data item is stored. According to the present example, each of the protected data items includes a different page of the protected data 132. However, alternative implementations are possible in which each of the protected data items includes another type of data unit (and/or portion) of the protected data 132.

According to the example of FIG. 3C, each entry 322 may include a data item identifier 324 that corresponds to a respective protected data item and an address 326, in the random-access memory 140, where a working copy of the protected data item is stored. Each data item identifier 324 may include any suitable number, string or alphanumerical string that can be used to identify one of the protected data items (retrieved at step 302). By way of example, each data item identifier 324 may include an address, in the memory 130, where (a master copy of) the protected data item is stored. As another example, each data item identifier may include an offset (from the start of the secure copy 144) where a secure copy of the protected data item is stored. As yet another example, each data item identifier 324 may include a hash digest of its corresponding protected data item. Stated succinctly, the present disclosure is not limited to using any specific type of data item identifier.

According to the example of FIG. 3C, entry 322-0 indicates that a working copy of a protected data item #0 is stored at address 0 in the random-access memory 140; entry 322-1 indicates that a working copy of protected data item #1 is stored address 1 in the random-access memory 140; and entry 322-N indicates that a working copy of a protected data item N is a stored at address N in the random-access memory 140, where N is a positive integer greater than 2. According to the present example, each of the addresses 326 includes an offset from the beginning of the working copy 142, where a working copy of the protected data item is stored. However, alternative implementations are possible in which another type of address is used. According to the present disclosure, the address 326 in each of the entries 322 may include any suitable number, string or alphanumerical string that indicates (directly or indirectly) a particular location in the random-access memory 140, where a working copy of the protected data item that is identified by the same entry 322 (i.e., the protected data item identified by data item identifier 324 of the same entry 322) is stored.

Although in the example of FIG. 3C the address map 300C is depicted as a table, it will be understood that the present disclosure is not limited to any specific implementation of the address map 300C. Although in the example of FIG. 3C the address map 300C is depicted as an integral data structure, it will be understood that alternative implementations are possible in which the address map 300C is implemented as a plurality of data structures. Although in the example of FIG. 3, each of the protected data items (retrieved at step 302) is identified explicitly by one of the data item identifiers 324, alternative implementations are possible in which the data item identifiers 324 are omitted from the address map 300C, and the protected data items are identified implicitly in the address map 300C (e.g., based on the ordering of the addresses 326.) Stated succinctly, the address map 300C is provided as an example only, and the present disclosure is not limited to any specific method for registering with the processor 120 (and/or the integrity monitor 122), the locations in the random-access memory 140 where the working copy 142 of the protected data 132 is stored.

Figure 4:
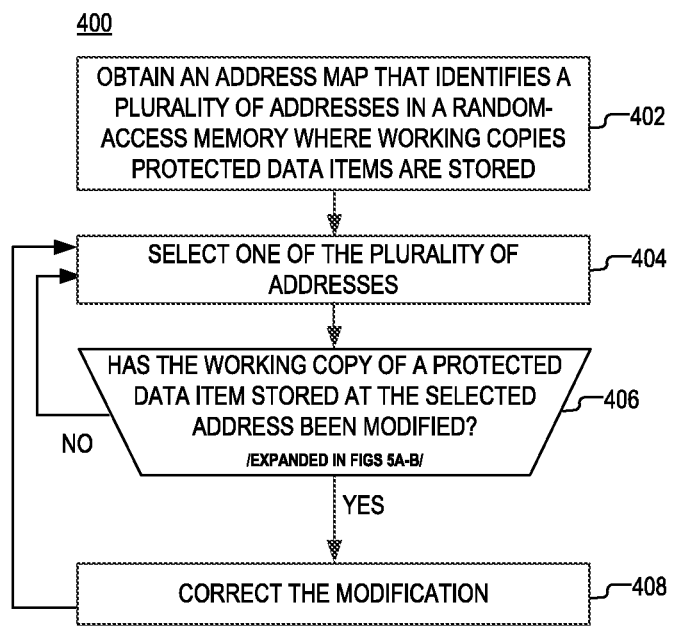
FIG. 4 is a flowchart of an example of a process, according to aspects of the disclosure.

FIG. 4 is a flowchart of an example of a process 400, according to aspects of the disclosure. According to the present example, the process 400 is performed by the processor 120 (and/or the integrity monitor 122). At step 402, the processor 120 obtains the address map 300C. At step 404, the processor 120 selects one of the addresses 326 that are identified in the address map 300C. At step 406, the processor 120 detects whether the working copy of a protected data item stored at the selected address (at step 304) has been modified. If the working copy of the protected data item has been modified, the process 400 proceeds to step 408. Otherwise, the process 400 returns to step 402. At step 408, the processor 120 corrects any modifications that have been made to the working copy of the protected data item.

In some implementations, correcting modifications to the working copy of the protected data item that is stored at the selected address 326 may include: (i) identifying a protected data item that has been stored at the selected address 326, (ii) retrieving a secure copy of the protected data item, and (iii) storing the secure copy at the selected address 326. As can be readily appreciated, storing the secure copy of the protected data item at the selected address 326 may result in correcting any modifications that have been made to the working copy of the protected data item, and restoring the working copy of the protected data item to its original state. In some implementations, the secure copy of a protected data item may include a page (or another portion) of the secure copy 144 of the protected data 132. In some implementations, identifying the protected data item that has been stored at the selected address 326 may include retrieving, from the address map 300C, a data item identifier 324 that is part of the same entry 322 as the selected address 326. In some implementations, the secure copy of the protected data item may be retrieved (or extracted) from the secure copy 144 (and or random-access memory 140) based on the retrieved data item identifier 324.

In other words, under the nomenclature of the present disclosure, the working copy 142 of the protected data is a collection of a working copies of protected data items, and the secure copy 144 of the protected data 132 is a collection of secure copies of protected data items. When the working copy of any of the protected data items is modified (e.g., by replacing it with new data or otherwise altering it), the memory location, in the random-access memory 140, where the working copy of the protected data item is stored, is overwritten with a secure copy of the same protected data item, thus correcting (or reversing) any modifications that have been made to the working copy of the protected data item. Correcting (or reversing) any modifications to the working copy of the protected data item may have the effect of interrupting any ongoing intrusion into the computing system 100, thus ensuring a safe and reliable operation of the computing system 100.

In some implementations, the processor 120 may select, in sequence, each of the addresses 326 that are identified in the address map 300C. For example, during the first iteration of steps 404-408, the processor 420 may select the address stored in entry 322-0 of the address map 300C; during the second iteration of steps 404-408, the processor 120 may selected the address 326 that is stored in entry 320-1 of the address map 300C, and so forth. After each of the addresses 326 (which are identified in the address map 300C) has been selected once, the processor 120 may start over again from the first entry 322 in the address map 300C. In other words, as a result of executing the process 400, the processor 120 may sequentially scan the addresses identified in the address map 300C to detect any modifications to the working copy 142 of the protected data 132 and correct any such modifications. In some implementations, the processor 120 may continue to execute the process 400 for as long as the computing system 100 is running. As noted above, the process 400 may be executed concurrently with the processor 110 executing the software 112 based on the working copy 142 of the protected data 132. Thus, as the software 112 is executed based on the working copy 142 of the protected data 132, the processor 120 may repeatedly visit each address in the random-access memory 140 where a portion of the working copy 142 is stored to determine if a protected data item stored at this address (which is not supposed to be altered) has been modified. If the protected data item is found to have been modified, the processor 120 corrects any modifications that have been made to the protected data item, and restores the protected data item to its original state.

Figure 5A:
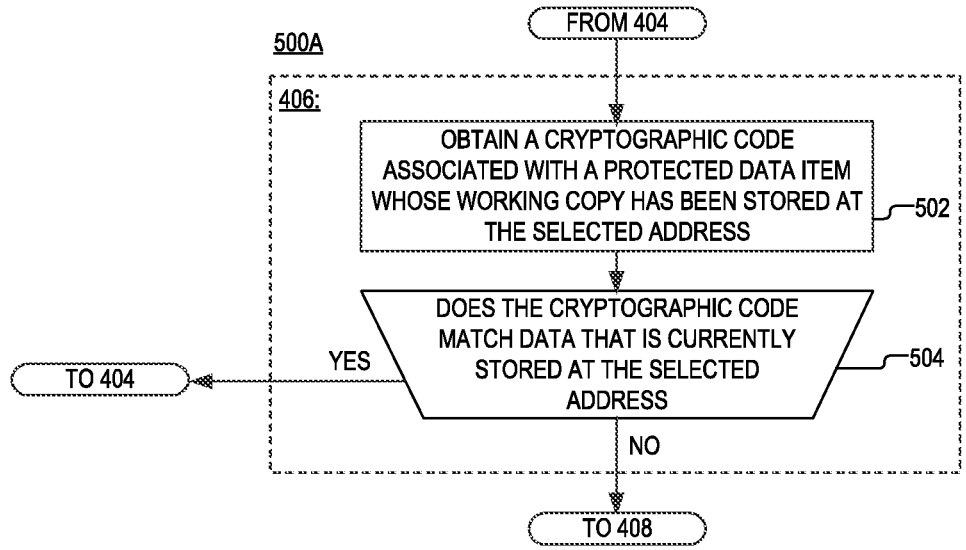
FIG. 5A is a flowchart of an example of a process, according to aspects of the disclosure.

FIG. 5A is a flowchart of an example of a process 500A for detecting whether the working copy a protected data item stored at the address (selected at step 404) has been modified, as specified by step 404 of the process 400. At step 502, a cryptographic code is obtained that is associated with the protected data item whose working copy is stored at the selected address. In some implementations, the cryptographic code may include an HMAC code, a hash digest, and/or any other suitable type of code that can be used to validate the integrity of (or otherwise authenticate) the protected data item. In some implementations, the cryptographic code may be retrieved from the random-access memory 140 and/or any other memory device. At step 504, the processor 120 determines whether the data that is currently stored at the selected address 326 matches the cryptographic code. It the data that is currently stored at the selected address 326 matches the cryptographic code, this is an indication that no changes have been made to the working copy of the protected data item (which was stored at the selected address 326 at step 304), and the process 500A returns to step 404. It the data that is currently stored at the selected address 326 does not match the cryptographic code, this is an indication that the working copy of the protected data item (which was stored at the selected address 326 at step 304) has been modified (e.g., overwritten with new data), and the process 500A returns to step 408.

Figure 5B:
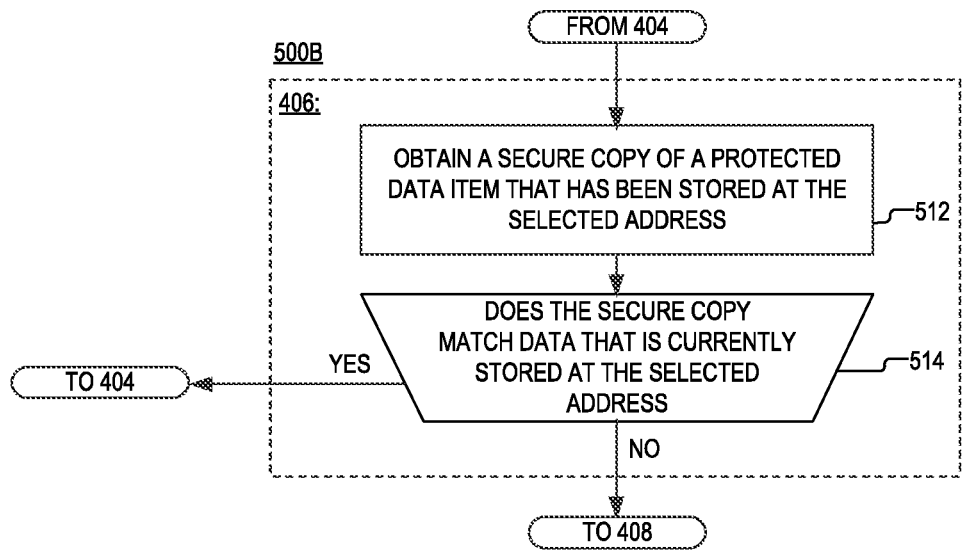
FIG. 5B is a flowchart of an example of a process, according to aspects of the disclosure.

FIG. 5B is a flowchart of an example of a process 500B for detecting whether the working copy of a protected data item stored at the address (selected at step 404) has been modified, as specified by step 404 of the process 400. At step 512, the processor 120 retrieves, from the random-access memory 140, a secure copy of the protected data item whose working copy is stored at the selected address 326. At step 514, the processor 120 determines whether the secure copy of the protected data item matches the data that is currently stored at selected address 326. It the data that is currently stored at the selected address 326 matches the secure copy, this is an indication that no changes have been made to the working copy of the protected data item (which was stored at the selected address 326 at step 304), and the process 500B returns to step 404. It the data that is currently stored at the selected address 326 does not match the secure copy, this is an indication that the working copy of the protected data item (which was stored at the selected address 326 at step 304) has been modified (e.g., overwritten with new data, etc.), and the process 500B returns to step 408.

The processes described herein are not limited to use with hardware and software of FIG. 1; they may find applicability in any computing or processing environment and with any type of machine or set of machines that is capable of running a computer program. The processes described herein may be implemented in hardware, software, or a combination of the two. The processes described herein may be implemented in computer programs executed on programmable computers/ machines that each includes a processor, a non-transitory machine-readable medium or another article of manufacture that is readable by the processor (including volatile and non-volatile memory and/or storage elements), at least one input device, and one or more output devices. Program code may be applied to data entered using an input device to perform any of the processes described herein and to generate output information.

The system may be implemented, at least in part, via a computer program product, (e.g., in a non-transitory machine-readable storage medium such as, for example, a non-transitory computer-readable medium), for execution by, or to control the operation of, data processing apparatus (e.g., a programmable processor, a computer, or multiple computers). Each such program may be implemented in a high-level procedural or object-oriented programming language to work with the rest of the computer-based system. However, the programs may be implemented in assembly, machine language, or Hardware Description Language. The language may be a compiled or an interpreted language, and it may be deployed in any form, including as a stand-alone program or as a module, component, subroutine, or another unit suitable for use in a computing environment. A computer program may be deployed to be executed on one computer or multiple computers at one site or distributed across multiple sites and interconnected by a communication network. A computer program may be stored on a non-transitory machine-readable medium that is readable by a general or special purpose programmable computer for configuring and operating the computer when the non-transitory machine-readable medium is read by the computer to perform the processes described herein. For example, the processes described herein may also be implemented as a non-transitory machine-readable storage medium, configured with a computer program, where upon execution, instructions in the computer program cause the computer to operate in accordance with the processes. A non-transitory machine-readable medium may include but is not limited to a hard drive, compact disc, flash memory, non-volatile memory, volatile memory, magnetic diskette and so forth but does not include a transitory signal per se.

Having described preferred embodiments, which serve to illustrate various concepts, structures and techniques, which are the subject of this patent, it will now become apparent that other embodiments incorporating these concepts, structures and techniques may be used. Accordingly, it is submitted that the scope of the patent should not be limited to the described embodiments but rather should be limited only by the spirit and scope of the following claims.

The invention claimed is:

1. A method for use in a computing system, comprising:
storing, in a random-access memory, a working copy of a data item, the working copy of the data item being stored in the random-access memory by a first processor;
registering, with a second processor, a respective address in the random-access memory where the working copy of the data item is stored, wherein registering the respective address includes generating a data structure that identifies the respective address as a location where the working copy of the data item has been stored;
detecting whether the working copy of the data item has been modified based on the data structure, wherein the detecting includes: using the data structure to determine that a working copy of the data item is expected to be stored at the respective address and detecting whether data that is currently stored at the respective address matches a representation of the data item; and
correcting, by the second processor, any modifications to the working copy of the data item that are made after the working copy of the data item is stored in the random-access memory, the modifications being corrected concurrently with the first processor executing software based on the working copy of the data item.

2. The method of claim 1, wherein correcting any modifications to the working copy of the data item includes storing a secure copy of the data item at the respective address.

3. The method of claim 1, wherein the representation of the data item includes a secure copy of the data item or a cryptographic code that is associated with the data item.

4. The method of claim 3, wherein the working copy of the data item and the secure copy of the data item are stored in memory devices that are physically separate from one another.

5. The method of claim 1, wherein the first processor includes a first core of a central processing unit and the second processor includes a second core of the central processing unit.

6. The method of claim 1, wherein the first processor includes at least one core of a general-purpose processing unit and the second processor incudes application-specific processing circuitry.

7. The method of claim 1, wherein the respective address in the random-access memory is registered with the second processor by a driver for the second processor that is executed on the first processor.

8. The method of claim 1, wherein the modifications are corrected in real-time or near real-time.

9. A system, comprising:
a random-access memory;
a first processor operatively coupled to the random-access memory; and a second processor that is operatively coupled to the random-access memory;

wherein the first processor is configured to store, at a respective address in the random-access memory, a working copy of a data item, and register, with the second processor, the respective address in the random-access memory where the working copy of the data item is stored, wherein registering the respective address includes generating a data structure that identifies the respective address as a location where the working copy of the data item has been stored; and wherein the second processor is configured to: (i) detect whether the working copy of the data item has been modified based on the data structure, wherein the detecting includes: using the data structure to determine that a working copy of the data item is expected to be stored at the respective address and detecting whether data that is currently stored at the respective address matches a representation of the data item, and (ii) correct any modifications to the working copy of the data item that are made after the working copy of the data item is stored at the respective address in the random-access memory, the modifications being corrected concurrently with the first processor executing software based on the working copy of the data item.

10. The system of claim 9, wherein correcting any modifications to the working copy of the data item includes storing a secure copy of the data item at the respective address.

11. The system of claim 9, wherein the representation of the data item includes a secure copy of the data item or a cryptographic code that is associated with the data item.

12. The system of claim 11, wherein the working copy of the data item and the secure copy of the data item are stored in memory devices that are physically separate from one another.

13. The system of claim 9, wherein the first processor includes a first core of a central processing unit and the second processor includes a second core of the central processing unit.

14. The system of claim 9, wherein the first processor includes at least one core of a general-purpose processing unit and the second processor incudes application-specific processing circuitry.

15. The system of claim 9, wherein the respective address in the random-access memory is registered with the second processor by a driver for the second processor that is executed on the first processor.

16. The system of claim 9, wherein the modifications are corrected in real-time or near real-time.

17. A non-transitory computer readable storage medium storing one or more processor executable instructions, which, when executed by a computing system cause the computing system to perform the operations of:

storing, in a random-access memory, a working copy of a data item, the working copy of the data item being stored in the random-access memory by a first processor;

registering, with a second processor, a respective address in the random-access memory where the working copy of the data item is stored, wherein registering the respective address includes generating a data structure that identifies the respective address as a location where the working copy of the data item has been stored;

detecting whether the working copy of the data item has been modified based on the data structure, wherein the detecting includes: using the data structure to determine that a working copy of the data item is expected to be stored at the respective address and detecting whether data that is currently stored at the respective address matches a representation of the data item; and correcting, by the second processor, any modifications to the working copy of the data item that are made after the working copy of the data item is stored in the random-access memory, the modifications being corrected concurrently with the first processor executing software based on the working copy of the data item.

18. The non-transitory computer readable storage medium of claim 17, wherein correcting any modifications to the working copy of the data item includes storing a secure copy of the data item at the respective address.

19. The non-transitory computer readable storage medium of claim 17, wherein the representation of the data item includes a secure copy of the data item or a cryptographic code that is associated with the data item.

20. The non-transitory computer readable storage medium of claim 19, wherein the working copy of the data item and the secure copy of the data item are stored in memory devices that are physically separate from one another.

* * * * *